United States Patent [19]

Inculet

[11] Patent Number: 5,478,533
[45] Date of Patent: Dec. 26, 1995

[54] METHOD AND APPARATUS FOR OZONE GENERATION AND TREATMENT OF WATER

[75] Inventor: Ion I. Inculet, Ontario, Canada

[73] Assignee: Cleft Engineering Corporation, Ontario, Canada

[21] Appl. No.: 291,949

[22] Filed: Aug. 17, 1994

[30] Foreign Application Priority Data

Aug. 18, 1993 [CA] Canada ................................. 2104355

[51] Int. Cl.⁶ ................................................. C01B 13/11
[52] U.S. Cl. ................................ 422/186.07; 422/186.12; 422/186.21; 422/906; 422/907; 204/176; 204/902; 423/581
[58] Field of Search .............................. 204/176, 902; 422/186.07, 186.21, 186.12, 906, 907; 423/581

[56] References Cited

U.S. PATENT DOCUMENTS

| | | | |
|---|---|---|---|
| 4,666,679 | 5/1987 | Masuda et al. | 422/186.2 |
| 4,970,056 | 11/1990 | Wooten et al. | 422/186.07 |
| 4,978,501 | 12/1990 | Diprose et al. | 422/22 |
| 5,004,587 | 4/1991 | Tacchi | 422/186.19 |
| 5,154,895 | 10/1992 | Moon | 422/186.07 |
| 5,211,919 | 5/1993 | Conrad | 422/186.07 |
| 5,316,740 | 5/1994 | Baker | 422/186.07 |

FOREIGN PATENT DOCUMENTS

| | | |
|---|---|---|
| 55100204 | 10/1980 | Japan. |
| 3181393 | 11/1991 | Japan. |
| 11960 | of 1913 | United Kingdom. |

OTHER PUBLICATIONS

Inculet et al., "High Efficiency Electrostatic Filter built with Dual Wire Fibres," IEEE 1993, 0-7803-1462-x/93, pp. 1749-1753.
International Search Report, (Nov. 11, 1994), International Application No. PCT/CA94/00460, conducted by EPO.
Inculet et al., "Dynamics of Sessile Droplets Deformation under Electric Fields in Microgravity," IEEE 1992, 0-7803-0634-Jan. 1992, pp. 1419-1427.

*Primary Examiner*—Donald P. Walsh
*Assistant Examiner*—Daniel Jenkins
*Attorney, Agent, or Firm*—Baker & Daniels

[57] ABSTRACT

A water treatment apparatus is provided in which the ozone generation and the water treatment may take place simultaneously. The ozone is generated from a continuous supply of air and/or oxygen at the surface of a running water by means of a high voltage electrode placed in the air or in oxygen at some distance above the water surface. The strong electric field between the high voltage electrode and the surface of the electrically grounded water stream generates a multitude of small Taylor cones at the surface of the water. Each Taylor cone goes into corona and in the process it generates the ozone. As the ozone is generated at the water surface, a substantial amount of ozone is immediately dissolved in water and the ozone that diffuses in the air continues to be in contact with the water surface. The undissolved ozone may be percolated through the same water for an additional primary or secondary ozonation.

32 Claims, 7 Drawing Sheets

METHOD AND APPARATUS FOR OZONE GENERATION AND TREATMENT OF WATER

This invention relates to a method and apparatus to generate ozone gas and the use of such a method and apparatus to permit simultaneous treatment of municipal and/or industrial waters.

The use of ozone to sterilize water has been known for a long time. Currently, in the world, there are over 2000 water treatment installations with ozone. Some of such installations treat as much as half a million cubic meters of water per day. In all such installations, the generation of the ozone and the water treatment are carried out in separate locations.

A typical construction of an ozone generator consists of a stainless steel tubular outer electrode. Inside the stainless steel tube is mounted a smaller diameter glass tube. The inside surface of the glass tube is coated with a conducting layer which acts as the second electrode. Air or oxygen is fed continuously through the space between the glass tube and the outer stainless steel tube. The glass tube itself is sealed at one end to prevent gas from flowing though the inside region where the electric field is zero. A high voltage AC potential is applied between the two electrodes and the electrical corona discharges at the surface of the glass in the space traversed by the air or oxygen contribute to generation of the ozone gas.

During the operation of the generator, the substantial amounts of heat which are generated by the strong alternating field in the system must be dissipated in order to maintain the ozone generation efficiency. It has been shown in the paper—"Generation of Ozone from Heated Positive Corona Wires for Electrostatic Charging", B. Makin and I. I. Inculet. Conference Record 1973, 8th Annual Meeting IEEE Industry Applications Society, Milwaukee, Wisconsin, October, pp. 381–389 (1973) that the ozone generation decreases substantially when the stressed electrode, i.e the corona wire, is heated. For this reason in ozone generators the stressed electrode is generally cooled by various means such as radiators or water cooling. In general, existing generators require substantial maintenance for replacement of the dielectric materials damaged by the electric stresses, the heat generated in the dielectric as well as by the contact with the ozone gas.

U.S. Pat. No. 4,666,679 discloses an ozone generator with a pair of gas chambers that are separated by a cooling chamber. An electrode in each of the gas chambers oxidises an air stream to provide ozone as it passes through the chambers. Whilst such an arrangement facilitates cooling of the electrodes, it nevertheless is a relatively complicated structure.

U.S. Pat. No. 4,970,056 discloses an ozone generator with a pair of spaced electrodes that cause a corona discharge to oxidise gas flowing between the electrodes. The electrodes are separated by a dielectric substrate to protect the gas from contamination caused by sputtering of the electrodes. This arrangement is however relatively expensive to manufacture and generates significant heat in operation.

U.S. Pat. No. 5,154,895 discloses an ozone generator in which a pair of electrodes are located within a liquid stream and an a.c. current applied between the electrodes. The oxygen in the liquid stream is dissociated, oxidised and absorbed within the liquid. This arrangement avoids additional bubble chambers and has the advantage of direct absorbtion of the ozone in the water. However, the immersion of both electrodes in the fluid stream causes a relatively high current and consequently a high power consumption.

It is therefore an object of the present invention to obviate or mitigate the above disadvantages.

In general terms, the present invention provides an ozone generator in which a body of water having a free surface is spaced from an electrode. An alternating high voltage is impressed on the electrode facing the free surface.

When an alternating potential is applied to the electrode which faces the streaming or stationary water's surface, a multitude of Taylor cones appear over the entire surface of the water which oscillate with the frequency of the applied potential.

As the tip of each Taylor cone is very sharp, alternating AC corona current pulses, positive and negative, appear from the tip of each cone. The discharge generates ozone at the surface of the water.

The corona currents are in the form of pulses because corona formation needs a minimum voltage to ionize the air Or the oxygen. As such, as the AC potential varies from positive to negative, the corona currents are formed only during the times when the voltage is above the minimum corona starting voltage. The phenomena happen both during the positive and negative values.

As the ozone is generated in the immediate vicinity of the water surface, and it is well known that the ozone gas dissolves in water, the generated ozone has an immediate killing effect on any bacteria present in the water as well as an oxidizing effect on organic matter.

According therefore to one aspect of the present invention, there is provided a method for generating ozone gas comprising the steps of:

applying an AC voltage to an electrode to generate an electric field of the same frequency as the applied voltage, providing a body of liquid with a free surface disposed opposite to said electrode, spacing said electrode from said free surface so that the electric field forms a multitude of Taylor cones at the free surface, and passing a gaseous stream containing oxygen between said electrode and said free surface to oxidise said oxygen upon corona discharge from said cones.

Preferably, the method includes the steps of dissolving the ozone in the body of liquid and collecting the surplus undissolved ozone in the water by locating collecting means in the path of the flow.

The surplus undissolved ozone may be used for supplementing the water treatment by known method such as bubbling.

According to another aspect of the present invention, there is provided an ozone generator comprising a body of liquid having a free surface, an electrode spaced from and overlying said free surface and an alternating high voltage potential connected to said electrode to impress an alternating electric field of said free surface, said field generating Taylor cones at said free surface and corona currents from the tips thereof to convert oxygen between said free surface and said electrode to ozone.

An embodiment of the invention will now be described by way of an example only with reference to the following drawings in which.

Figure 1:
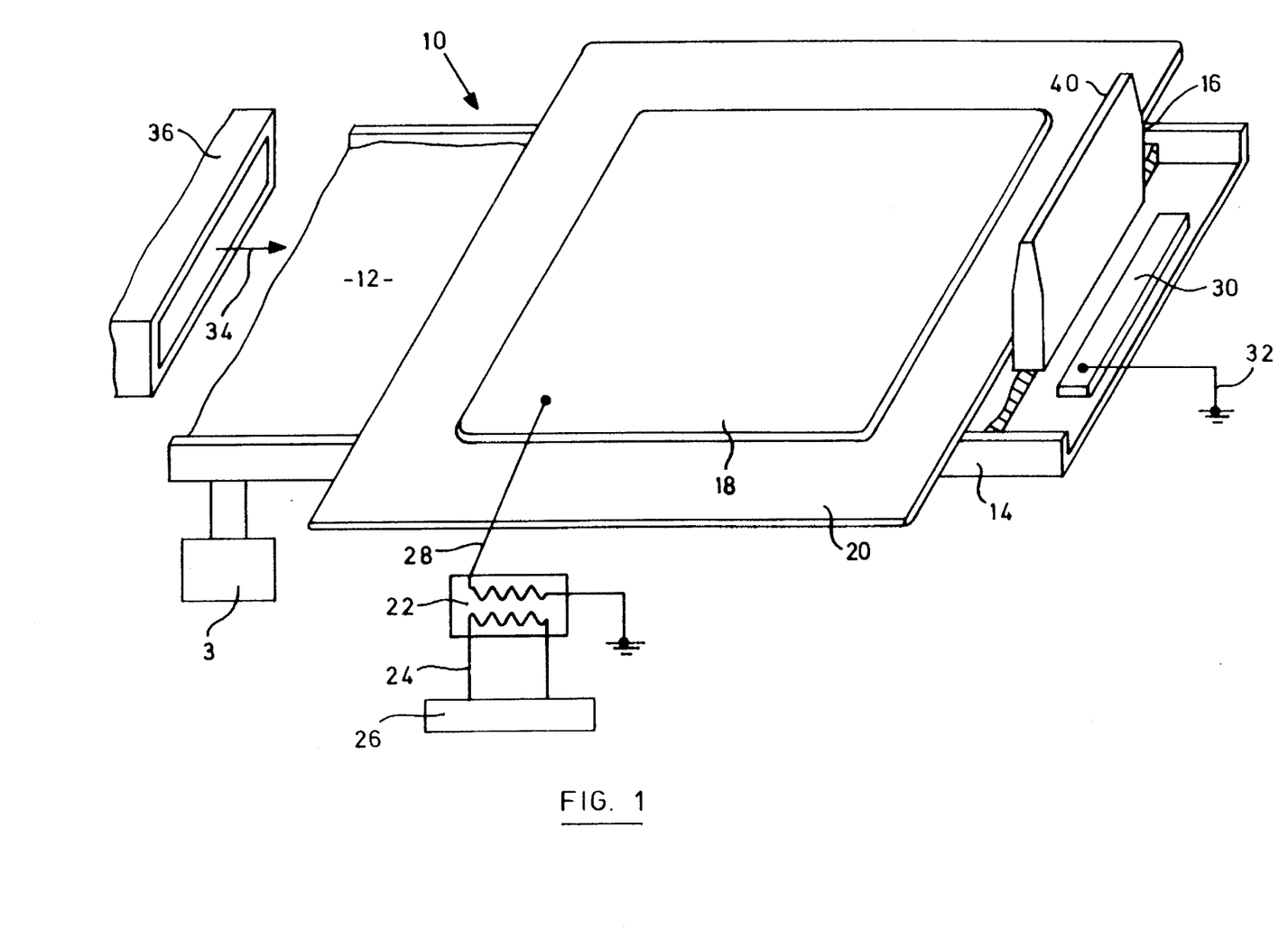
FIG. 1 is a schematic view of the ozone generation and water treatment system.
Figure 3:
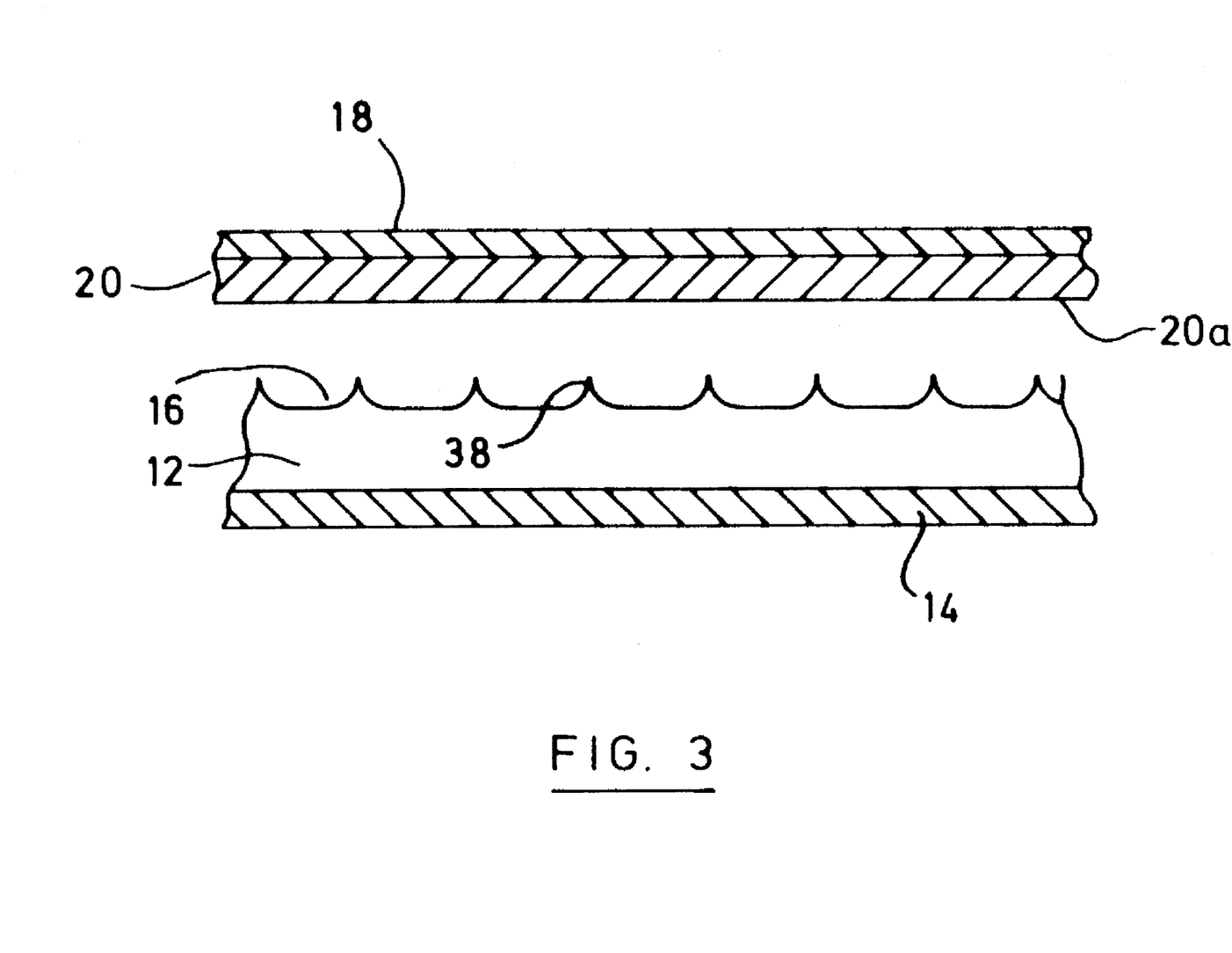
FIG. 3 is a section on the line 3—3 of FIG. 1.

Referring therefore to the drawings, an ozone generator 10 is used to treat a flow of water indicated at 12 which is constrained to flow along a channel 14. The flowing water has a free surface 16 which is directed toward an electrode 18. The electrode 18 extends across and along the channel 14 and, as can best be seen in FIG. 3, is spaced from the free surface 16. A dielectric insulation 20 is interposed between the free surface 16 and the electrode 18 to inhibit shortcircuiting between the electrode and the water under certain configurations.

The electrode 18 receives electric potential from a high voltage power supply 22 which is connected through conductors 24 to a low voltage alternating current generator 26. The high voltage power supply 22 is connected through conductor 28 to the electrode and supplies an alternating high voltage in the order of 20 kV to 45 kV and conveniently at a frequency of 60 Hz.

The channel 14 is connected to ground through an electrode 30 and conductor 32.

As may be seen from FIGS. 1 and 3, the lower surface 20a of dielectric 20 is spaced from the free surface 16 of the water stream 12 and an air stream 34 is passed across the free surface 16 by means of a blower 36. A vibrator 37 is connected to the channel 14 to induce increased turbulence at the free surface 16.

Figure 2:
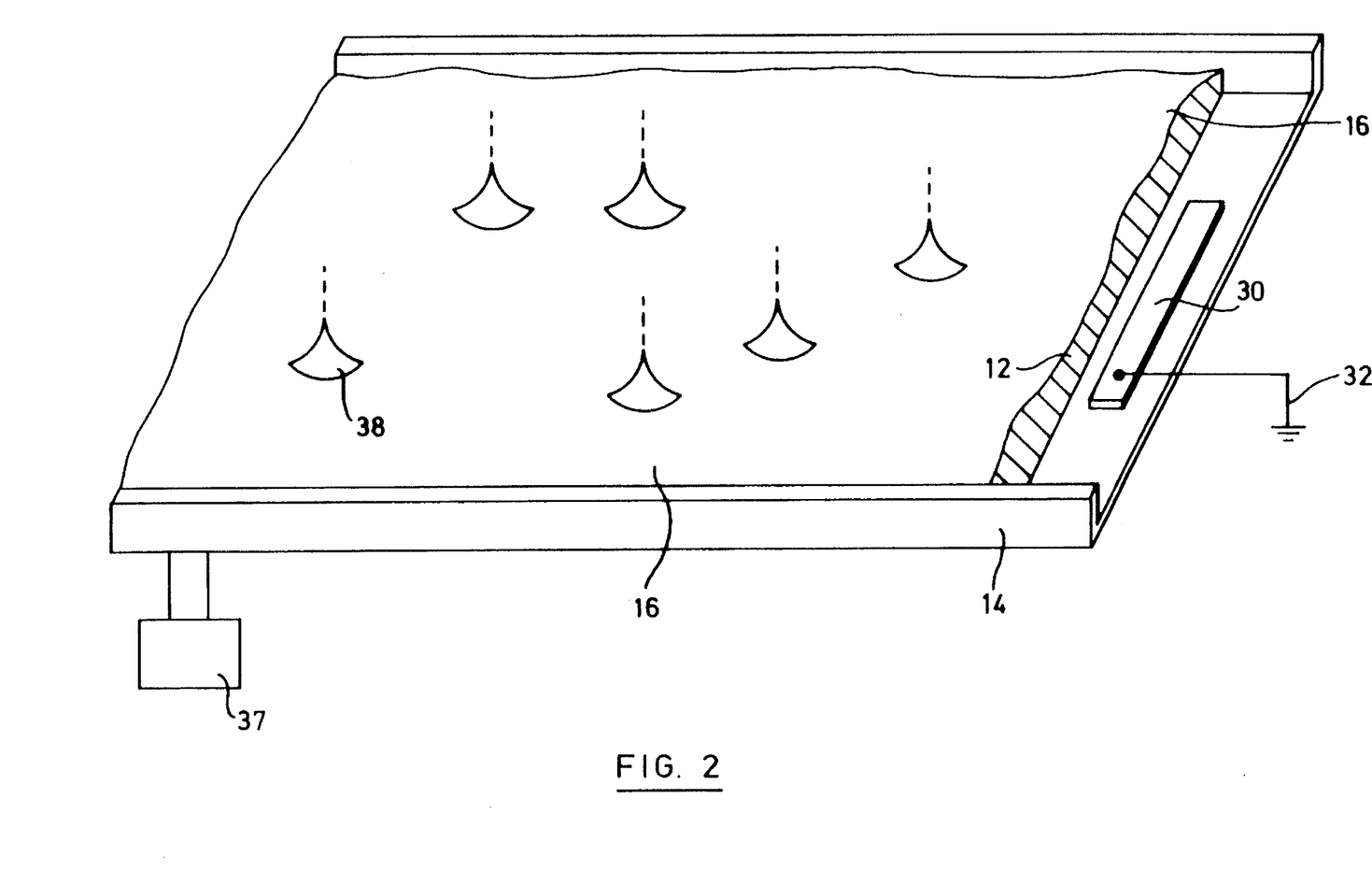
FIG. 2 shows a portion of the apparatus of FIG. 1 in operation.

In operation, the electrode 18 impresses a high voltage alternating electric field across the air gap to the free surface 16 of the water 12. The impressed field is of sufficient intensity that a multitude of Taylor cones appear as indicated at 38 at the free surface 16. The formation of the Taylor cone was first analyzed by Sir Geoffrey Taylor in a paper published in the proceedings of the Royal Society in the United Kingdom in 1964 when it was observed that the application of a electrical field of sufficient intensity will cause a water droplet to assume a conical formation.

The tip of each of the Taylor cones 38 induced by the electrode 18 at the free surface 16 is very sharp and with sufficient field intensity will cause a corona current pulse. The alternating field provides alternating positive and negative corona current pulses from the cones 38 that are formed as the field increases. These current pulses are formed only during times when the applied field is above the minimum corona starting voltage.

The corona currents generate ozone from the airstream 34 adjacent to the free surface 16 by converting oxygen to ozone. As the ozone is generated in the immediate vicinity of the water surface 16, it is readily absorbed into the water 12 leading to sterilization of the water.

The absorbtion is enhanced due to the turbulence at the free surface 16. The induced cones 38 exhibit an up and down oscillation as well as a change of location. The oscillation is due to the change of the polarity of the induced charges at the tip of the cone and the change of location is due to the turbulence appearing at the surface of the water. The resulting motion of the Taylor cones 38 as well as the up and down oscillation contribute to a more intimate contact of the water 12 with the ozone as it is generated at the tip of the cones and therefore enhances absorbtion. The vibrator 37 increases the turbulence in the water to complement the action of the electric field. In certain cases however, the vibrator 37 need not be used.

The generation of ozone may be enhanced by enriching the airstream 34 with oxygen or providing a stream of pure oxygen between the lower surface of the dielectric 20 and the free surface 16. Of course, the apparatus shown in FIGS. 1 through 3 would be enclosed within a suitable housing to contain the surplus ozone that may be generated. Any surplus ozone is extracted from the down stream edge of the electrode 20 as indicated by the collection hood 40 in FIG. 1 and may be used to supplement the sterilization of the water stream by conventional bubbling or other treatment.

The potential applied to the electrode 20 may be varied depending upon the operating conditions of the apparatus. Typically a voltage in the range of 1 kV to 200 kV could be used although for most practical installations a voltage in the range 20 kV to 45 kV appears appropriate. The spacing of the lower surface of the dielectric from the free surface 16 may also be varied and air gaps between 0.25" and 0.75" have been found to be satisfactory. It is anticipated that air gaps of up to 3 inches may prove beneficial in commercial applications with an increased air gap requiring an increase in the applied voltage. Similarly, the dielectric may be varied both in material and in thickness. The results shown in FIGS. 4, 5 and 6 were obtained with the dielectric being formed from "Teflon" (Reg'd Trade Mark) with a thickness of between 0.25" and 0.5".

Figure 4:
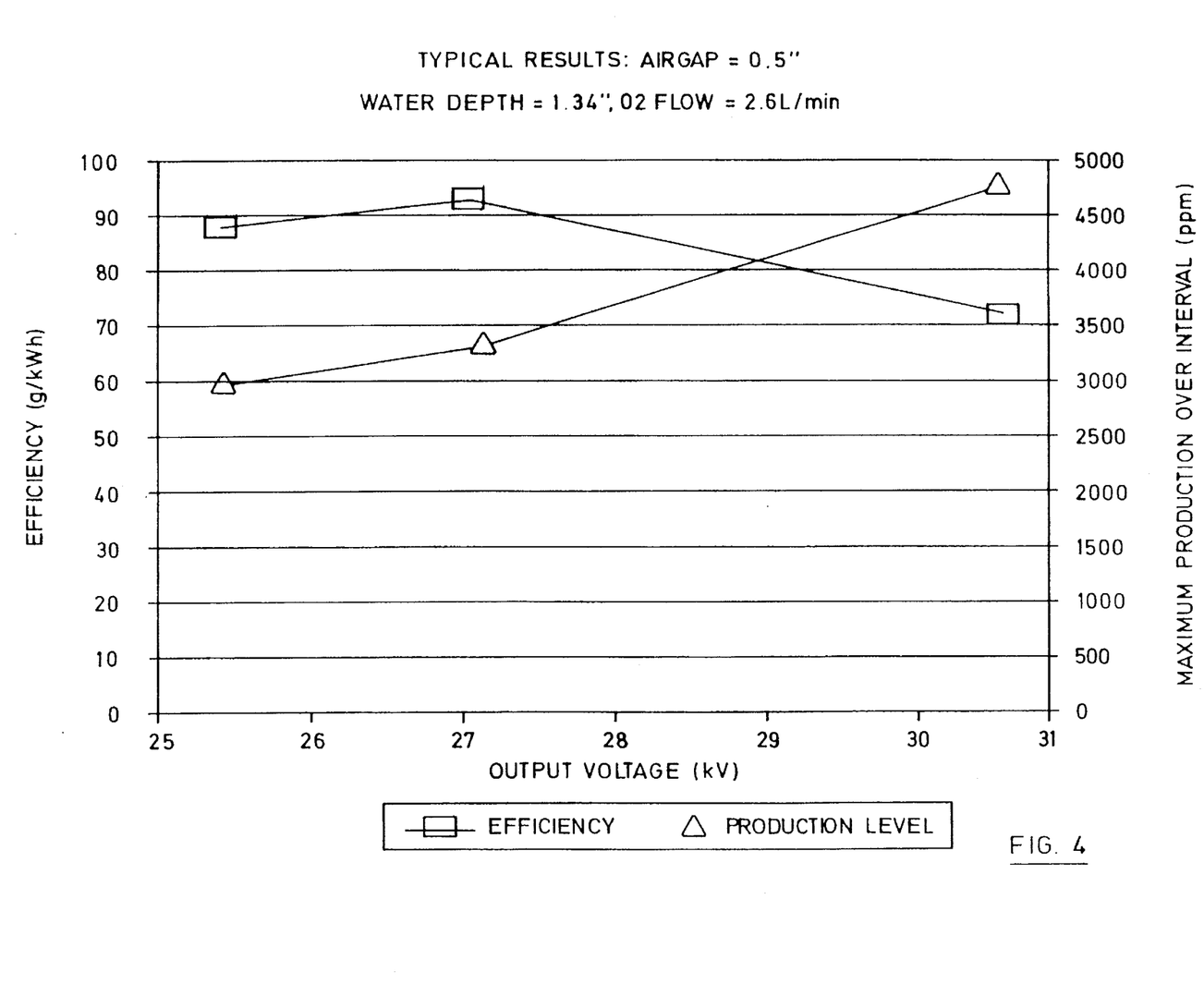
FIGS. 4, 5, 6 and 7 are performance curves showing operating characteristics and the effect of modifying the configuration of the apparatus of FIGS. 1 to 3.
Figure 5:
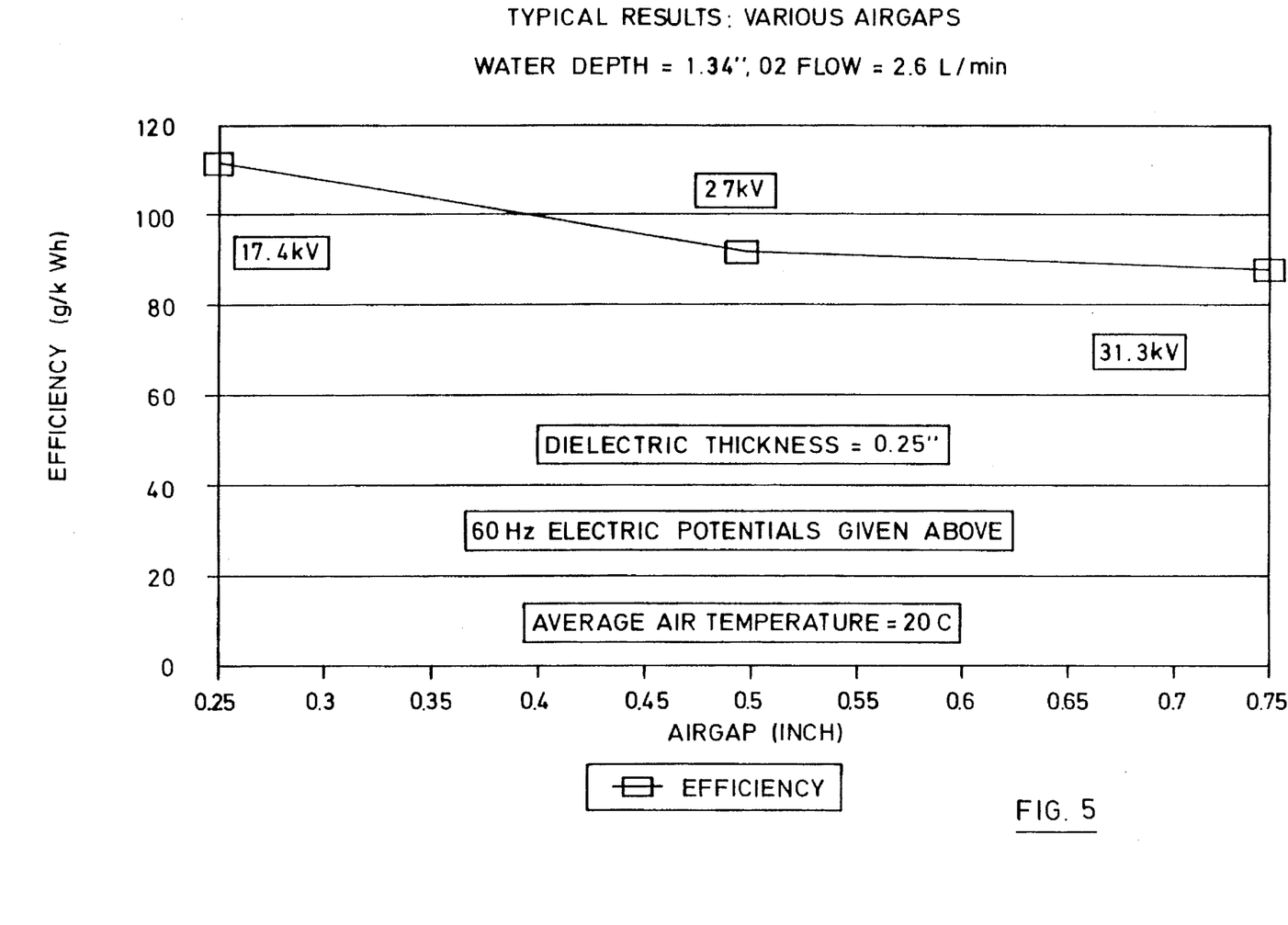
Figure 6:
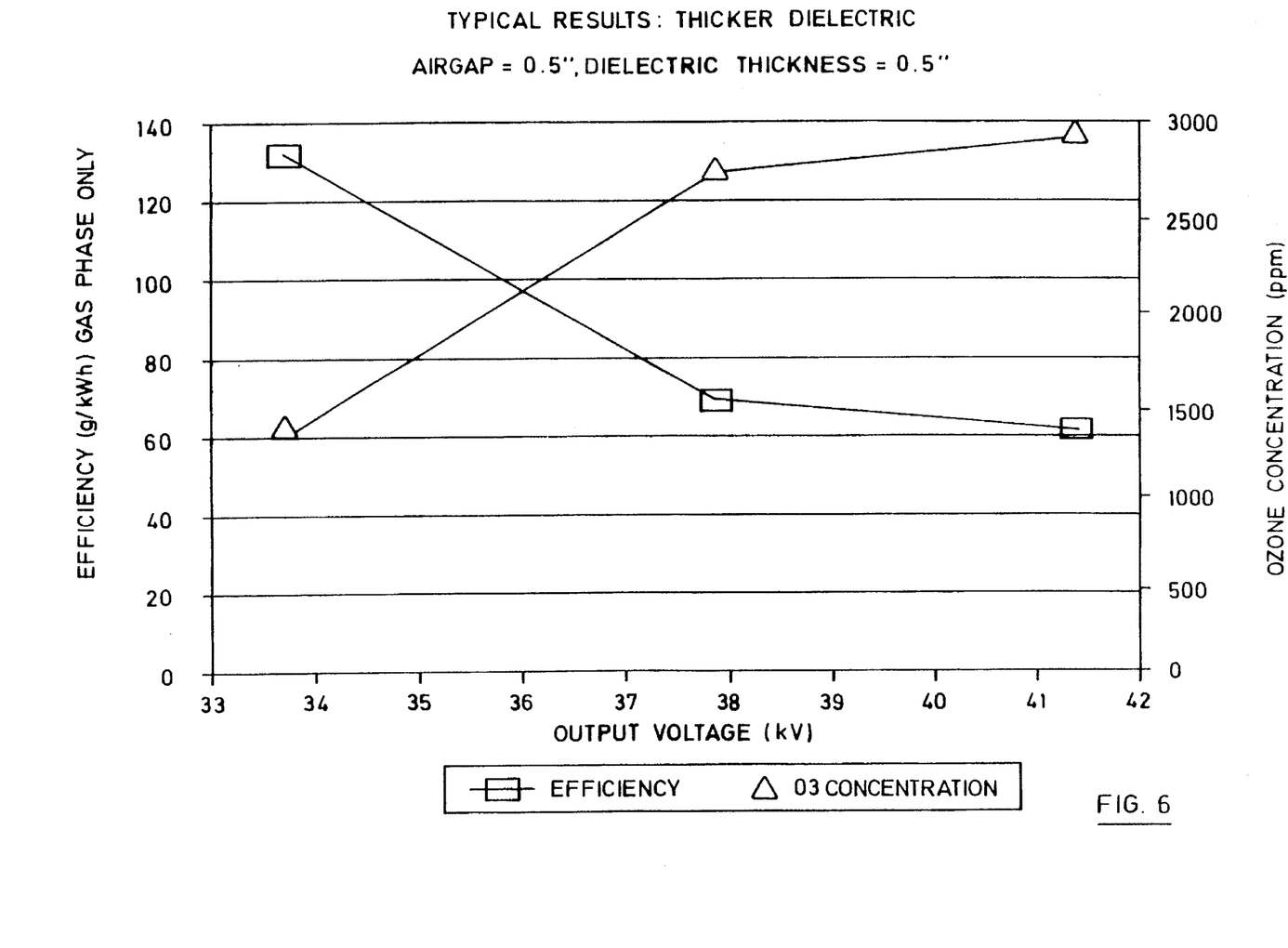

Preliminary results obtained from laboratory scale equipment are shown in FIGS. 4, 5 and 6. As may be seen from FIG. 4, for a configuration with a fixed air gap, varying the voltage leads to an increased level of production of the ozone. The efficiency of production expressed in g/kWh remains generally high as the voltage is increased.

FIG. 5 illustrates the effect of varying the air gap between the lower surface of the dielectric and the free surface 16. The thickness of the dielectric is maintained constant at ¼" and as the air gap is increased from 0.25" to 0.75" the efficiency drops slightly. At the same time, the voltage impressed by the electrode is increased to maintain the maximum efficiency.

As shown in FIG. 6, increasing the thickness of the dielectric together with an increase applied voltage enhances the concentration of ozone but does lead to reduced efficiency in production.

Figure 7:
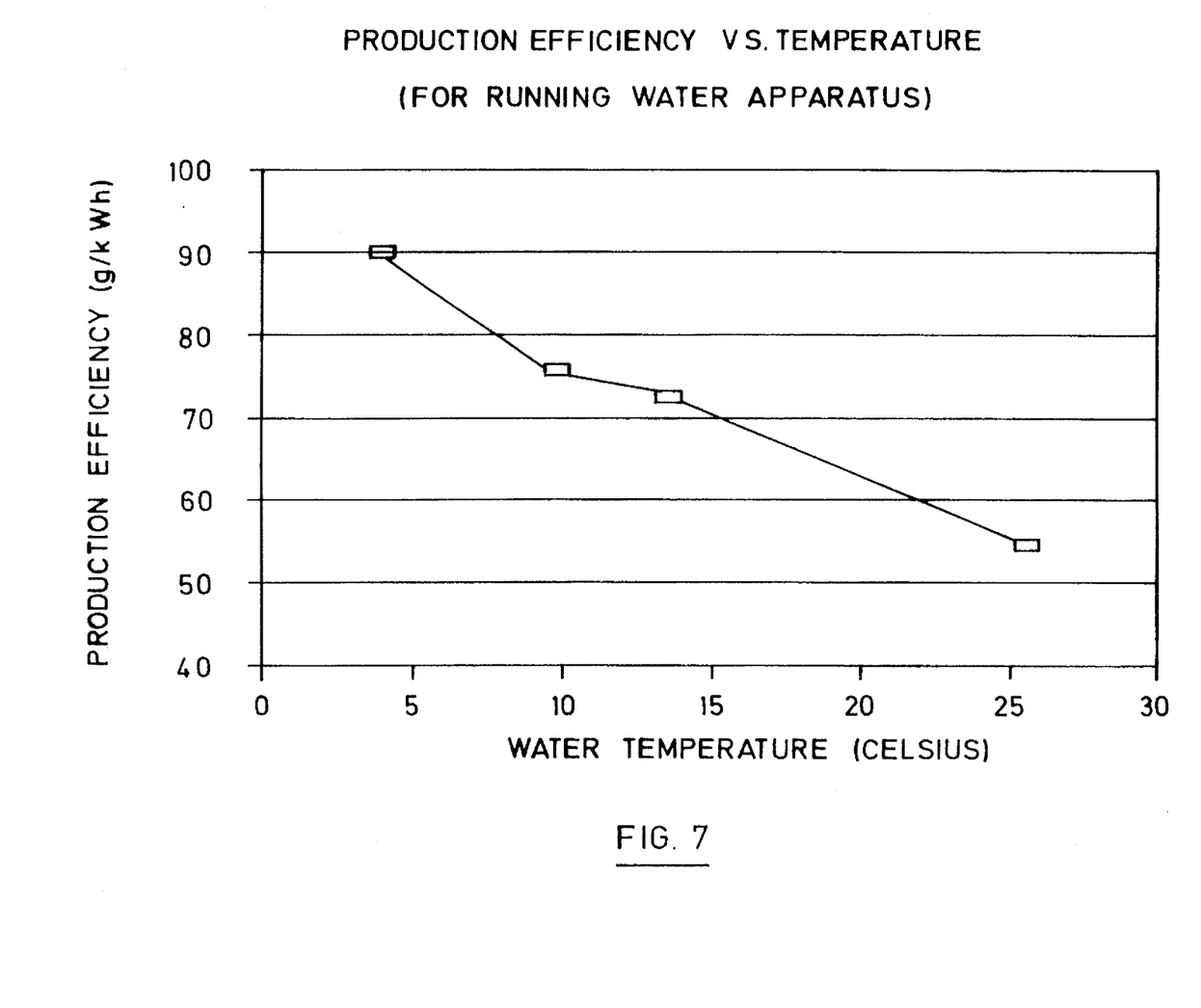

A further important factor in production efficiency is the temperature of the water as shown in FIG. 7. From the graph for FIG. 7 it can be seen that as the temperature of the water increases the production efficiency decreases with a given configuration.

It will be appreciated that the results discussed above are applicable to a preliminary laboratory scale installation but do indicate the effectiveness and simplicity of operation of the ozone generator.

In addition to preventing short circuits, the dielectric insulator 20 prevents contact of the ozone with the electrode 18 allowing a simple metal electrode to be utilized such as copper or aluminum without the corrosive effects normally associated with ozone. The entire electrode may be encapsulated with the dielectric as appropriate. The dielectric insulator 20 also enhances the field intensity by accumulating space charges during each half cycle. The space charges will be of opposite polarity to the impressed potential but, upon reverse of the potential, the space charges are additive to the potential thereby increasing the field intensity. This effect is beneficial for early onset of the corona current permitting either enhanced production or lower applied voltage.

The applied voltage is conveniently supplied at a sinusoidal mains frequency that is 60 Hz but alternative frequencies may be used and alternative waveforms. Frequencies in the range 0.01 to 5000 Hz may be used but conveniently frequencies of 50 Hz or 60 Hz or multiples thereof are used. Where available, a square wave may be beneficial to increase the period during which Taylor cones are generated.

It will also be appreciated that where the apparatus is enclosed within a sealed housing, the gaseous stream 34 may be supplied at super atmospheric pressure of between 50 to 600 kP to increase the density of the gas in contact with the water.

Although the apparatus is being described with water as the liquid to be treated, it will also be apparent that other liquids requiring treatment by ozone or beneficial in the production of ozone could be utilized.

The apparatus described above is particularly beneficial for treating water as it is a continuous process but, of course, where production of ozone alone is required then the body of fluid may be stationary and the free ozone collected for subsequent use.

It will be seen therefore that a simple yet effective apparatus and method are provided for generating ozone and for using that ozone in the treatment of a liquid stream.

It will also be appreciated that although channel 14 has been shown in a horizontal position, it could be inclined to promote flow or the electrode could be disposed vertically adjacent a vertical stream of water. In each case, a free surface, i.e. a liquid/gas interface is directed toward the electrode to permit formation of the Taylor cones.

Whilst it is feasible to apply the high voltage to the water stream, provided of course it is insulated, and to ground the electrode 18, the practical difficulties of insulating the water dictate that the high voltage is applied to the electrode 18 and the electrode provided by the both of water is grounded.

I claim:

1. A method of generating ozone comprising the steps of:
   applying an AC voltage between a pair of electrodes to generate an electric field of the same frequency as the applied voltage;
   providing a body of liquid with a free surface disposed opposite one of said electrodes;
   spacing said one electrode from said free surface so that the electric field forms a multitude of Taylor cones at the free surface; and
   passing of gaseous stream containing oxygen between said one electrode and said free surface to oxidise said oxygen upon corona discharge from said cones.

2. A method according to claim 1 wherein said body of liquid is flowing past said one electrode.

3. A method according to claim 1 wherein said one electrode is electrically insulated from said free surface.

4. A method according to claim 2 including the step of dissolving said ozone in said liquid.

5. A method according to claim 4 including the step of collecting surplus ozone by locating a collection device in the path of flow of the liquid.

6. A method according to claim 5 wherein said surplus ozone is applied to said liquid stream.

7. A method to claim 1 wherein said liquid is water.

8. A method according to claim 1 wherein the voltage applied between said electrodes is in the range 1 kilovolt to 200 kilovolt.

9. A method according to claim 8 wherein said voltage is in the range 20 kV to 45 kV.

10. A method according to claim 8 wherein the frequency of the applied voltage is in the range of 0.01 to 5000 Hertz.

11. A method according to claim 10 wherein the frequency of the applied voltage is in the range of 50 Hz to 60 Hz.

12. A method according to claim 10 wherein said applied voltage varies generally sinusoidally.

13. A method according to claim 10 wherein said applied voltage varies as a square wave.

14. A method according to claim 4 including the step of promoting turbulence at said free surface to enhance the absorbtion of ozone in the liquid.

15. An ozone generator comprising a body of liquid having a free surface, pair of electrodes one of which is spaced from and overlying said free surface and an alternating high voltage potential connected between said electrodes to impress an alternating electric field at said free surface, said field generating Taylor cones at said free surface and corona currents from the tips thereof to convert oxygen between said free surface into ozone.

16. An ozone generator according to claim 15 wherein a dielectric insulator is interposed between said free surface and said one electrode.

17. An ozone generator according to claim 16 wherein said body of liquid is flowing past said electrode.

18. An ozone generator according to claim 16 including a blower to induce a gaseous flow past said electrode between said insulator and said free surface.

19. An ozone generator according to claim 18 wherein said gaseous flow is air.

20. An ozone generator according to claim 19 wherein said air flow is enriched with oxygen.

21. An ozone generator according to claim 19 wherein said air flow is at superatmospheric pressure.

22. An ozone generator according to claim 15 wherein means are provided for inducing turbulence at said free surface.

23. An ozone generator according to claim 22 wherein said means includes a vibrator connected to a channel carrying said body of liquid.

24. An ozone generator according to claim 16 said high voltage potential is in the range of 1 kV to 200 kV.

25. An ozone generator according to claim 16 wherein said high voltage potential is in the range of 20 kV to 45 kV.

26. An ozone generator according to claim 25 wherein said alternating voltage varies sinusoidally.

27. An ozone generator according to claim 26 wherein said voltage alternates at a frequency of between 0.01 Hz and 5000 Hz.

28. An ozone generator according to claim 25 wherein said alternating voltage varies with a frequency in the range of 50 Hz to 60 Hz.

29. An ozone generator according to claim 16 where said liquid is water.

30. An ozone generator according to claim 16 wherein said insulator has a thickness of between 0.25" and 0.5".

31. An ozone generator according to claim 30 wherein said insulator is spaced from said free surface to provide a gap in the range of 0.25" to 3.0".

32. An ozone generator according to claim 31 wherein said gap is in the range of 0.25" to 0.75".

* * * * *